W. T. Munger,
Knob Latch,

No. 2,361, Reissued Sept. 18, 1866.

Witnesses

E. Newton

John S. Shumway

Inventor

W. T. Munger

By his atty. John E. Earl

UNITED STATES PATENT OFFICE.

WALLACE T. MUNGER AND J. A. LEGGAT, OF BRANFORD, CONNECTICUT, ASSIGNEES OF WALLACE T. MUNGER.

IMPROVEMENT IN KNOB-LATCHES.

Specification forming part of Letters Patent No. 53,745, dated April 3, 1866; Reissue No. 2,361, dated September 18, 1866.

*To all whom it may concern:*

Be it known that we, WALLACE T. MUNGER and J. A. LEGGAT, both of Branford, in the county of New Haven and State of Connecticut, assignees of WALLACE T. MUNGER, of same place, did obtain Letters Patent of the United States, No. 53,745, for Improvement in Knob-Latches, bearing date the 3d day of April, 1866; and we do hereby declare the following to be a full, clear, and exact description of said improvement, reference being had to the accompanying drawings, forming part of this specification, and in which—

Figure 1:
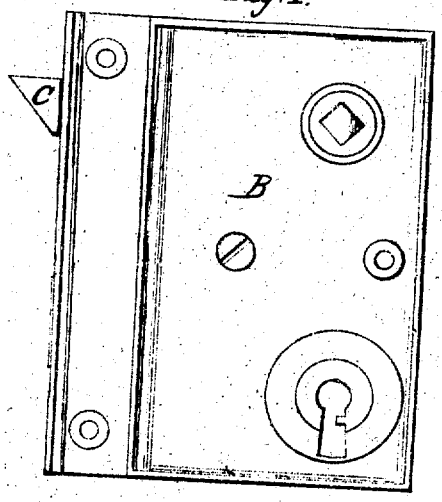
Figure 2:
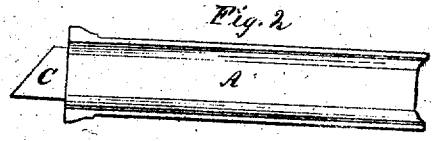
Figure 3:
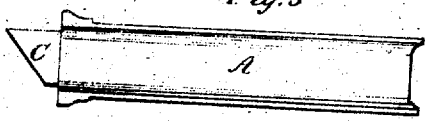
Figure 4:
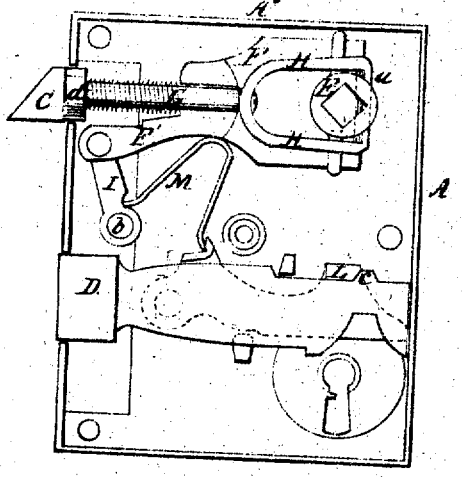

Figure 1 is a face view of the case to the latch, showing also the latch-bolt as shot or protruded; Fig. 2, an upper-edge view of the same, with the latch-bolt set as for a left-hand door; Fig. 3, a similar view thereof, with the latch-bolt reversed—that is, set for a right-hand door; Fig. 4, a face view of the case, with the outer plate removed, and showing the interior mechanism whereby the latch-bolt may be operated and made reversible, also showing a lock-bolt and mechanism for operating it; and Figs. 5 and 6, sectional views of parts in detail, illustrating the different positions of the latch-bolt when the knob-spindle is inserted and when it is withdrawn from gear with said bolt.

This invention relates to an improvement in locks or latches, whether mortise or other descriptions, whereby the latch-bolt may be reversed, so as to adapt it to either a right or left hand door, or other purpose; and the nature of the improvement consists, first, in so constructing the follower and combining the latch-bolt, or the device or devices connected to it, with the follower as that by simply withdrawing the knob-spindle, so as to detach or take it out of gear with the bolt, the latter may be reversed by its protruding head without removing the outer plate of the case or of necessity detaching other parts, and so that when the knob-spindle is inserted again or its gear with the bolt re-established said latch-bolt is prevented from being reversed; and the improvement further or secondly consists in a novel combination, applicable where both a latch and lock-bolt are fitted in the same case, of a U-spring with the two latter for action upon both, and whereby increased facility is given for putting the whole lock together, and the spring and other parts are more securely held in place.

To enable others skilled in the art to which this improvement relates to make and use it, the following description is given of it, with reference to the accompanying drawings, in which—

A is the latch or latch and lock case; B, the outer detachable plate covering one of its sides or faces; C, the latch bolt or head thereof, which is or may be of the usual form where it extends beyond the edge of the case, and, except when being reversed, where it fits the usual or suitable aperture in said edge; but beyond this, or in rear of it, the bolt-head is cut away or made with a round shoulder, *d*, to permit of said latch-bolt being reversed when the portion of its head in front of its shoulder or reduction is drawn or forced out of gear with said edge of the case.

Figure 5:
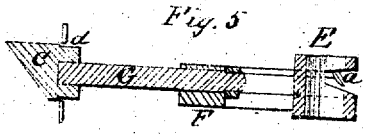

E is the follower, through which the knob-spindle, as usual, passes. This follower is recessed or cut away (see Figs. 4 and 5) to receive within it a projection or cross-bar, *a*, from or of a suitable extension or attachment, H, which serves to independently connect the latch-bolt by its stem with the follower for action by the knob-spindle, as hereinafter described, the connection of the latch-stem to its attachment that gears it with the follower or knob-spindle being such as to admit of the latch-head C being reversed or turned from right to left, or vice versa, as in Figs. 2 and 3, when out of gear with the edge of the case, as shown in Figs. 4 and 5.

The latch-bolt may be guided or held to its place in its longitudinal movement in the usual or any suitable manner, and a spring or springs, as usual, either arranged round the latch-stem or otherwise, be employed to shoot it outward. Where, however, a locking-bolt is used in the same case with the latch, a U-spring acting upon both the latch and locking-bolt is or may be preferred, and an independent spring to the latch-bolt avoided.

Figure 6:
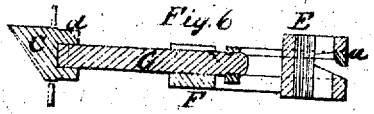

Now, it will be evident that when the knob-spindle is withdrawn from the follower or out of gear with the latch-bolt the latter may be shot, drawn, or forced farther outward than is admissible when the knob-spindle is inserted by the projection or cross-bar *a* entering so far into the cut-away portion of the follower as to be within the space previously occupied by the knob-spindle. Thus the latch-head C, when drawn or forced out of gear with the edge of the case by its rounded or reduced portion *d* lying therein (see Figs. 4 and 5) may be reversed or turned from right or left, or vice versa, without removing the outer plate, B, or of necessity detaching or ungearing other than the knob-spindle; but when the knob-spindle is inserted or projected through the follower E it necessarily moves the projection *a* back, or the latter is forced back by pushing in the latch-bolt, to permit of the knob-spindle passing through the follower. This brings the full or square-formed portion of the head C into the aperture in the end of the case, as shown in Fig. 6, which restrains the latch-bolt from turning, so that the ungearing of the knob-spindle permits of the latch-bolt being reversed and the gearing of it again prevents reversal of it. Said latch-bolt is or may be operated through the follower by the knob-spindle to unlatch by an arm or arms from it acting on the attachment that connects or gears the latch-bolt with the follower in the ordinary or any approved manner, a spring or springs, as before observed, shooting, as usual, the bolt forward to latch.

The second part of this improvement will now be explained.

D is a locking-bolt; L, the catch which holds it back or forward, as the case may be, by dropping to either side of a projection, *c*, on said bolt, in the usual manner; and M is a U-spring, arranged to bear upon the bolt D or its tumbler, as is well known and understood, and at the same time at its other end to act upon the latch-bolt to shoot it outward, which may be done through the intervention of an independent attachment or attachments, F, F′, and I, connected with the latch-bolt. The U shape of spring is preferable to a coiled or other form, as it and the device or parts which the spring bears on are more securely held in place, and the spring itself less liable to get loose, which facilitates the putting of the whole lock together.

What is here claimed as new and useful is—

1. The follower E, recessed on its rear side, in combination with the bar *a* of the yoke H, attached to the latch-bolt, substantially as and for the purpose specified.

2. The horseshoe F, link I, and spring M, in combination with the lock-bolt D, substantially as and for the purpose set forth.

W. T. MUNGER.
JOHN A. LEGGAT.

Witnesses:
J. E. RUSSELL,
JOHN NICOLL.